United States Patent [19]

Ito et al.

[11] Patent Number: 5,464,566

[45] Date of Patent: Nov. 7, 1995

[54] COATING SOLUTION COMPOSITION FOR FORMING GLASS GEL THIN FILM, COLOR GLASS GEL FILTER, AND DISPLAY DEVICE USING THE SAME

[75] Inventors: Takeo Ito; Hidemi Matsuda, both of Tokyo; Kazuo Sakai, Kawanishi, all of Japan

[73] Assignees: Kabushiki Kaisha Toshiba, Kawasaki; Fuji Pigment Co., Ltd., Kawanishi, both of Japan

[21] Appl. No.: 296,597

[22] Filed: Aug. 29, 1994

Related U.S. Application Data

[63] Continuation of Ser. No. 854,397, Mar. 19, 1992.

[30] Foreign Application Priority Data

Mar. 20, 1991 [JP] Japan ......................... 3-80602

[51] Int. Cl.[6] .................................. F21V 9/00
[52] U.S. Cl. ............................. 252/582; 427/64
[58] Field of Search ..................... 313/478, 479; 252/582, 315.01; 359/885, 64, 68; 427/64, 68

[56] References Cited

U.S. PATENT DOCUMENTS

| | | | |
|---|---|---|---|
| 4,760,310 | 7/1988 | Deyama et al. | 313/479 |
| 4,785,217 | 9/1988 | Matsuda et al. | 313/479 |
| 4,943,542 | 7/1990 | Hayashi et al. | 313/479 |
| 4,945,282 | 7/1990 | Kawamura et al. | 313/479 |
| 4,977,347 | 12/1990 | Itou et al. | 313/478 |
| 4,987,338 | 1/1991 | Itou et al. | 313/478 |
| 5,153,481 | 10/1992 | Matsuda et al. | 313/479 |
| 5,291,097 | 3/1994 | Kawamura et al. | 313/478 |
| 5,315,209 | 5/1994 | Iwasaki | 313/478 |

FOREIGN PATENT DOCUMENTS

| | | |
|---|---|---|
| 0246757 | 11/1987 | European Pat. Off. |
| 0366090 | 5/1990 | European Pat. Off. |
| 1-320742 | 12/1989 | Japan |
| 545691 | 7/1985 | Spain |
| 2086367 | 5/1982 | United Kingdom |

OTHER PUBLICATIONS

Chemical Abstracts, vol. 106, (1987) May, No. 20, Columbus, Ohio, USA, Abstract No. 161369Z, p. 320.

"Spectroscopy and Applications of Molecules in Glasses," *Journal of Non-Crystalline Solids,* 121 No. 1/3, May 1, 1990, Amsterdam, NL, pp. 254–266.

*Primary Examiner*—Philip Tucker
*Attorney, Agent, or Firm*—Cushman Darby & Cushman

[57] ABSTRACT

A coating solution composition for forming a glass gel thin film, contains at least one material selected from the group consisting of a metal alkoxide and a polycondensate of the metal alkoxide, a coloring material, an alcohol solvent, and a dispersant having an adsorption material for the coloring material, soluble in the alcohol solvent, and having miscibility with the metal alkoxide, wherein the coloring material has an average particle size of 3 nm to 300 nm. A glass gel thin film obtained by sintering this composition at a temperature of 100° to 300° C. is excellent in water resistance, durability and has a high strength.

10 Claims, 4 Drawing Sheets

○ OXYGEN ATOM
● SILICON ATOM
⊜ DYE

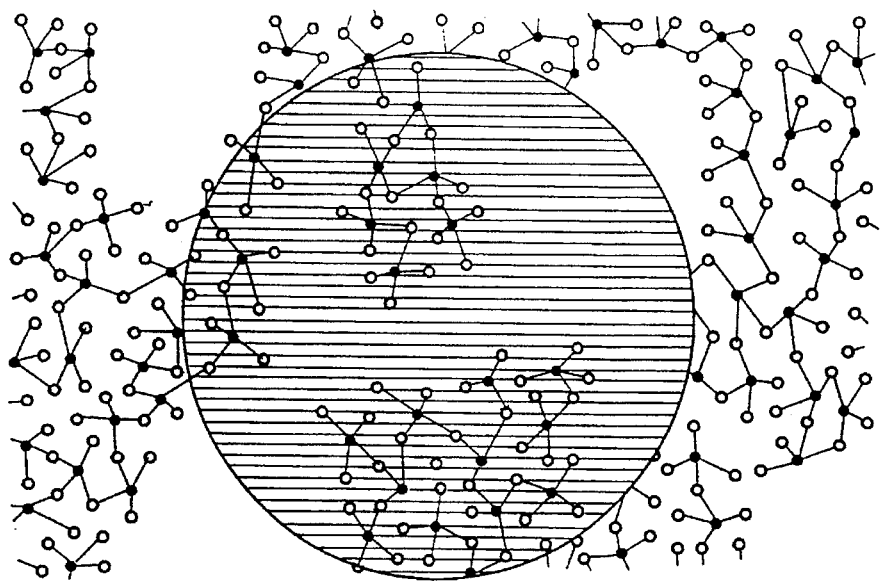
○ OXYGEN ATOM
● SILICON ATOM
⊖ PIGMENT
F I G. 2A
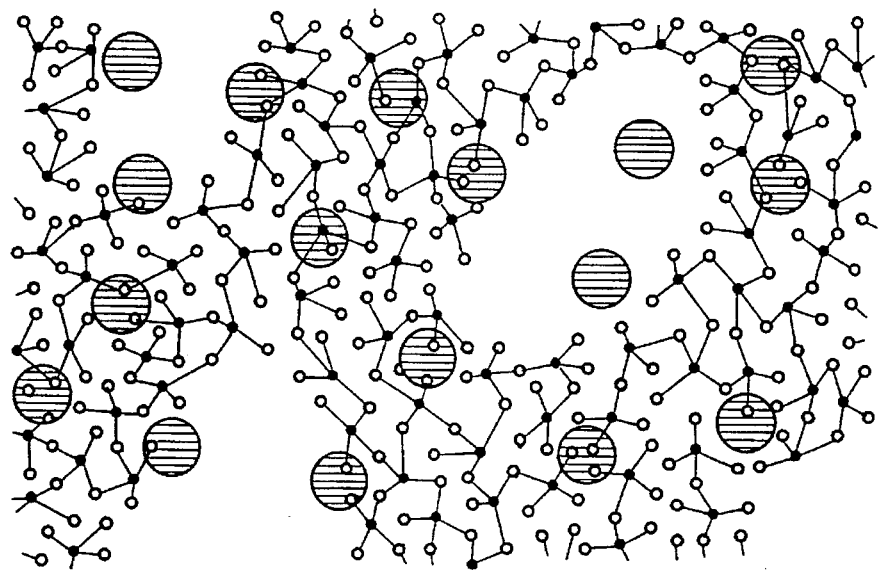
○ OXYGEN ATOM
● SILICON ATOM
⊖ DYE
$\overrightarrow{5\text{Å}}$
F I G. 2B

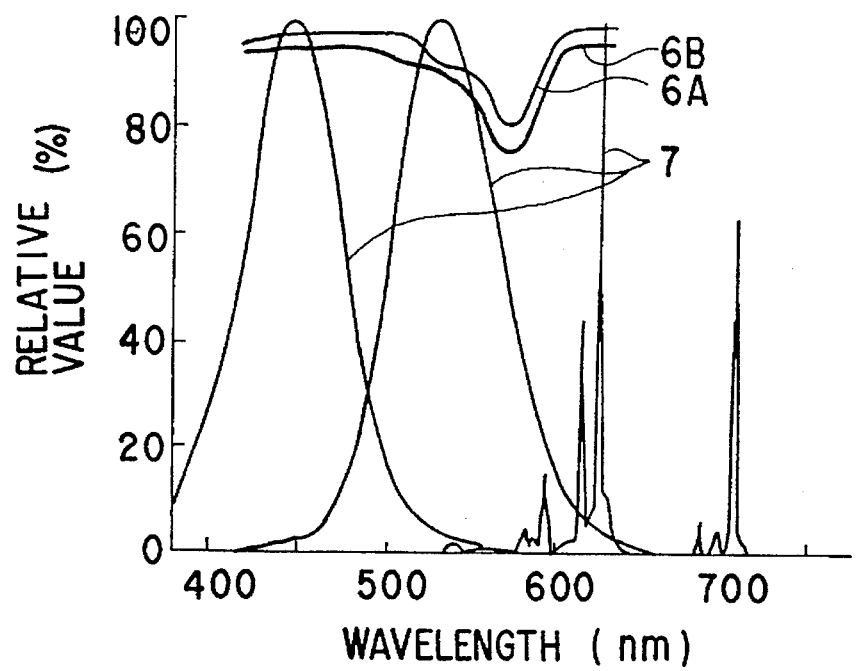
F I G. 3
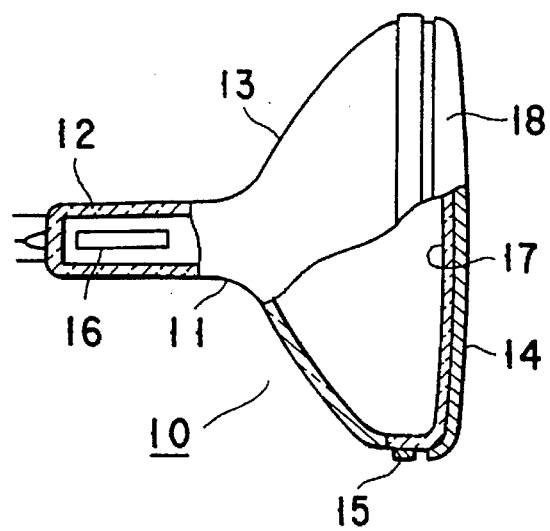
F I G. 4

COATING SOLUTION COMPOSITION FOR FORMING GLASS GEL THIN FILM, COLOR GLASS GEL FILTER, AND DISPLAY DEVICE USING THE SAME

This is a continuation of application Ser. No. 07/854,397, filed Mar. 19, 1992 now allowed.

BACKGROUND OF THE INVENTION

1. Field of the Invention

The present invention relates to a coating solution composition for forming a glass gel thin film comprising a metal alkoxide and a coloring material, a color glass gel filter, and a display device employing the glass gel filter.

2. Description of the Related Art

A filter having selective light-absorbing properties is formed on the outer surface of a conventional display device to improve its contrast characteristics. A glass-film is generally used in this filter. In order to obtain desired filter characteristics of this glass film, a coloring material having appropriate light-absorbing properties can be contained in the glass film. An organic coloring material is preferable as coloring material to obtain desired filter characteristics since many kinds of organic coloring materials are available. However, an inorganic coloring material can also be used.

A sol-gel method is generally used as a method of forming a glass film. According to this method, a solution mixture of a metal alkoxide, water, an acid, a coloring material and an alcohol, i.e., a coating solution composition, is hydrolyzed and polycondensed to obtain a gel film. In a general sol-gel method, the coating solution composition is sintered at a temperature of about 1,000° C. However, an organic coloring material is decomposed at this temperature. To the contrary, a means for sintering a coating film containing a coloring material at a low temperature to form a glass thin film having selective light-absorbing properties is disclosed in Published Unexamined Japanese Patent Application No. 1-320742. In this Published Unexamined Japanese Patent Application No. 1-320742, a dye is used as a coloring material since the body color does not change by external light and desired light-absorbing filter characteristics can be obtained. As a result, practical selective light-absorbing properties can be obtained.

A glass thin film obtained by sintering at 500° C. or less in the sol-gel method has many pores and is highly porous. When a dye or organic pigment capable of obtaining a sharp color is used as a coloring material, a maximum sintering temperature of a coating solution composition should be about 300° C. or less due to heat resistance. For this reason, the resultant glass film tends to be porous. The glass film obtained by low-temperature sintering cannot be a sufficiently dense film. Many pores exist as defects in the film are numerous, thus resulting in a porous glass gel-like film (to be referred to as a glass gel film hereinafter).

As a result, particularly when a dye is used as the coloring material, the resulting product has a problem of water resistance. That is, water or chemicals permeate through the film surface to elute the coloring material. In addition, since a coloring material having a small particle size is used to improve transparency of a glass gel film, oxidation and discoloration of the coloring material by oxygen, ultraviolet rays, and the like cannot be perfectly prevented. This glass gel thin film tends to allow permeation of oxygen. In addition, when a glass gel film has defects in its skeleton structure, its mechanical strength tends to decrease.

Under these circumstances, there has been proposed a means for vitrifying a material by high-temperature sintering using an inorganic coloring having material excellent heat resistance in place of using an organic coloring material having poor heat resistance, thereby eliminating the defects of the glass gel thin film obtained by low-temperature sintering and hence obtaining a high mechanical strength. For this purpose, however, the material must be sintered at a temperature of 500° C. or more for a long period of time. It is very costly to perform high-temperature sintering for a long period of time. In particular, it is very expensive to perform such high-temperature sintering of electronic devices such as a display device. It is also difficult to obtain desired filter characteristics by using only inorganic coloring material due to less kinds of inorganic coloring material compared with an organic coloring material.

A glass film having filter characteristics has been formed by a conventional sol-gel method. In this method, since a low sintering temperature is set in consideration of heat resistance of a coloring material to be used, the resultant glass gel film is porous and has poor water resistance. The particle size of the coloring material must be small to improve transparency of the film. The conventional glass film thus poses a problem on the resistance to ultraviolet rays. In addition, the strength of the film on the filter is not sufficient.

SUMMARY OF THE INVENTION

It is an object of the present invention to provide a coating solution capable of easy forming, at a low temperature, a coloring material-containing glass gel thin film having water resistance and resistance to ultraviolet rays while maintaining excellent optical characteristics of the coloring material-containing glass gel film, and a display device which has the coloring material-containing glass gel thin film and is excellent in contrast and color purity characteristics.

According to the present invention, there is provided a coating solution composition for forming a glass gel thin film, comprising: at least one material selected from the group consisting of a metal alkoxide and a polycondensate of the metal alkoxide; a coloring material; an alcohol solvent; and a dispersant capable of absorbing the coloring material, soluble in the alcohol solvent, and miscible with the metal alkoxide, wherein the coloring material has an average particle size of 3 nm to 300 nm.

According to the present invention, there is provided a glass gel thin film having selective light absorbing properties formed by sintering a coating film essentially consisting of the coating solution composition for forming the glass gel thin film in the temperature range of 100° C. to 300° C.

According to the present invention, there is also provided a display device comprising a display unit and a selective light-absorbing glass gel filter obtained by sintering a coating film coated on the outer surface of a display unit substrate and essentially consisting of the coating solution composition for forming the glass gel thin film in the temperature range of 100° C. to 300° C.

In the coating solution composition for forming a glass gel thin film according to the present invention, the particle size of the coloring material component is limited, and a dispersant capable of absorbing the coloring material is used. For these reasons, the coloring material can be firmly retained within the glass gel thin film. Therefore, a good glass gel thin film excellent in water resistance, durability, and film strength can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B are views for explaining a bonded state between a coloring material and a glass gel film in FIGS. 1A and 1B;

FIG. 3 is a graph showing a relationship between the light-transmitting characteristics of a color glass gel filter and the emission spectra of a color picture tube according to an embodiment of the present invention;

FIG. 4 is a partially cutaway plan view showing a structure of a color picture tube according to the present invention;

DETAILED DESCRIPTION OF THE PREFERRED EMBODIMENTS

Figure 1A:
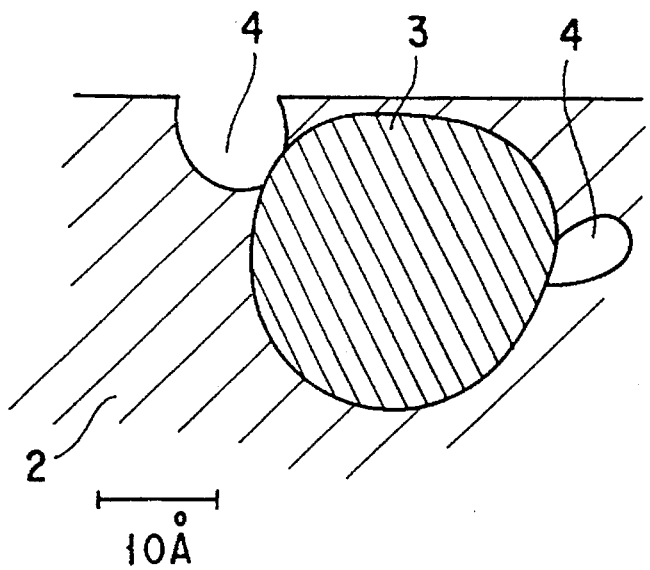
FIGS. 1A and 1B are views for explaining a function of the particle size of a coloring material.

A coating solution composition for forming a glass gel thin film according to the present invention comprises: at least one material selected from the group consisting of a metal alkoxide and a polycondensate of the metal alkoxide; a coloring material; an alcohol solvent; and a dispersant capable of absorbing the coloring material, soluble in the alcohol solvent, and miscible with the metal alkoxide, wherein the coloring material has an average particle size of 3 nm to 300 nm.

The average particle size of the coloring material preferably falls within the range of 5 to 200 nm.

In this coating solution composition, the following conditions are preferably satisfied:

$B/A = 10^{-4}$ to 2

$C/A = 10^{-4}$ to 2

$(A+B+C)/D = 10^{-3}$ to 0.5 where A is the total weight of the metal alkoxide or the polycondensate of the metal alkoxide, B is the total weight of the coloring material, C is the total weight of the dispersant, and D is the total weight of the coating solution.

If the ratio B/A is less than $10^{-4}$, coloring is insufficient, while if the ratio B/A is more than 2, film strength is decreased. If the ratio C/A is less than $10^{-4}$, a coloring material tends to deteriorate, while if the ratio C/A is more than 2, film strength is decreased. If the ratio $(A+B+C)/D$ is less than $10^{-3}$ film thickness is not sufficient for practical use, while if $(A+B+C)/D$ being more than 0.5, leads to stability of the coating solution. In addition, C/B is preferably 0.005 to 1.

The coloring material is preferably a material selected from the group consisting of an organic pigment and an inorganic pigment.

Examples of the organic pigment include azo-type pigments (e.g., benzidine yellow and carmine FB), condensed pigments (e.g., perylene, perynone, dioxadine, thioindigo, isoindolinone, quinophthalone, or quinacridone), and phthalocyanine-type pigments.

Examples of the inorganic pigment include carbon black, titanium white, iron oxide, chrome yellow, cobalt blue, ultramarine, prussian blue, and molybdate orange.

Any alcohol can be used as the alcohol solvent, such as isopropyl alcohol, ethanol, methanol, butanol, methoxymethanol, ethoxyethanol, propoxymethanol and butoxyethanol etc.

Examples of the dispersant include a polyvinyl butyral resin, a polyvinyl alcohol resin, an acrylic resin, an ethyl cellulose, an unsaturated polycarboxylic acid, and a phosphate surface active agent.

Examples of the metal alkoxide include alkoxides of Si, Zn, Zr, Ti, Al, Fe, Co, and Ni.

According to the present invention, there is further provided a glass gel thin film obtained by sintering a coating film, formed by coating the coating solution composition for forming a glass gel thin film, in the temperature range of 100° C. to 300° C.

This glass gel film has selective light-absorbing properties. The wavelength range of light to be absorbed can be arbitrarily changed upon an appropriate choice of a coloring material to be used.

A transparent substrate is preferably used as a substrate for this glass gel film.

According to the present invention, there is further provided a display device comprising a glass gel filter having selective light-absorbing properties and obtained such that a coating film obtained by applying the coating solution composition for forming a glass gel thin film is formed on the outer surface of a display unit body and is sintered at a temperature falling within the range of 100° C. to 300° C.

Examples of the display device are a cathode-ray tube, a liquid crystal display, and a plasma display.

The selective light-absorbing properties of the glass gel filter can be properly changed in accordance with the type of coloring material to be used.

For example, when the display device comprises a cathode-ray tube, a filter used in the cathode-ray tube has an absorption peak at 575±20 nm in the wavelength range of 400 to 650 nm. In addition, this filter satisfies the following conditions:

$T_{min} \leq T_{550} < T_{530}$ $1 \leq T_{450}/T_{630} \leq 2$ $1 \leq T_{630}/T_{530} \leq 2$ $0.7 \leq T_{450}/T_{530} \leq 1.43$ where $T_{450}$ is the transmittance for light having a wavelength of 450 nm, $T_{530}$ is the transmittance for light having a wavelength of 530 nm, $T_{550}$ is the transmissivity for light having a wavelength of 550 nm, $T_{630}$ is the transmittance for light having a wavelength of 630 nm, and $T_{min}$ is the transmittance for light having a wavelength corresponding to the absorption peak when the display device comprises a liquid crystal display, the wavelength of light to be absorbed preferably falls within the range of 550 nm to 600 nm. When the display device comprises a plasma display, the wavelength of light to be absorbed preferably falls within the range of 400 nm to 600 nm.

Techniques used in the present invention will be described below.

A sol-gel method is known well as a method of obtaining an amorphous metal oxide such as glass at a low temperature. According to this sol-gel method, a solution of a metal organic or inorganic compound is hydrolyzed and polycondensed to form a sol, the polycondensation reaction is allowed to progress further to form a gel, and the gel is heated to obtain a solid metal oxide. A typical example of a metal compound serving as a starting material is an alkoxide. A general formation process of a silica glass film by the sol-gel method will be described below when a Si alkoxide such as tetraethoxysilane is used as a metal compound, this alkoxide is dissolved in a solvent such as an alcohol. Small amounts of an acid and water are added to the resultant solution and to cause the following reactions to form a sol:

Hydrolysis: $Si(OR)_4 + 2H_2O \rightarrow Si(OH)_4 + 4ROH$

Dehydrated Condensation: $nSi(OH)_4 \rightarrow [SiO_2]_n + 2nH_2O$

In the process for applying this sol solution to a substrate and drying it, the sol applied to the substrate is changed into a gel. In this process, the sol particles form siloxane bonds, and the sol particles thus bonded form a skeleton structure of a gel. The resultant glass gel film is sintered to increase the number of siloxane bonds of the particles, thereby obtaining a glass gel thin film having high strength. In order to eliminate pores of the glass gel thin film to obtain a perfect glass film, a temperature of 500° C. or more, and normally 1,000° C. or more is required for, e.g., silica.

The glass gel thin film according to the present invention is obtained by sintering the gel film at a temperature equal to or less than the decomposition temperature of the coloring material contained by the sol-gel method. In this case, glass means an amorphous metal oxide.

Such a glass gel thin film is selected to obtain an optical thin film having a specific spectral transmittance because of the simple manufacturing process and heat resistance of the coloring material. More specifically, most of coloring materials and particularly dyes and organic coloring materials are decomposed at high temperatures of 300° C. or more. Some inorganic materials such as molybdate orange and ultramarine also pose a problem of heat resistance. For this reason, a gel film is preferably sintered at a temperature equal to or less than the decomposition temperature of each coloring material when glass gel thin films are formed at 300° C. or less, most of the coloring materials including both of organic and inorganic coloring materials, can be used and spectral transmittance and hues can be selected freely.

Glass gel thin films containing coloring materials obtained at sintering temperatures of 300° C. or less pose problems of water resistance, durability, and resistance to light. These problems will be described in detail below.

For example, in order to form a glass gel thin film containing a dye, the dye is mixed with a starting solution to form a sol, and the sol is applied to a substrate and is dried. The amount of the dye is incorporated in the sol particles in the solution is very small. Most of the dye is embedded between the sol particles in the gel during coating and drying, i.e., gel formation. In other words, most of the dye is present in the pores of the formed gel. This state is kept unchanged even if sol particles form siloxane bonds upon sintering. Since a hydroxyl group generated by hydrolysis of a metal alkoxide or the like is present on the surface of the pore portion, the film has a good hydrophilic property, and water tends to permeate in the pore portion. Hence water resistance is problematically affected. That is, water permeating in the pores causes the dye present in the pore portion to elute. As a result, a desired spectral transmittance of the glass gel thin film cannot be maintained.

Even if a pigment or the like is used, it is retained in the gel so as to be embedded in sol particles during formation of the gel in the same manner as described above. If the particle size of the pigment is excessively small, elution of the coloring material occurs as in the dye. However, if the particle size of the pigment is excessively large, light scattering occurs, thereby impairing transparency.

Even if the pigment has a particle size which does not impair the transparency, the film strength is degraded due to the following reason. Pigment particles form a structure of the gel together with metal oxide particles obtained by hydrolysis and polycondensation of the metal alkoxide and the like. However, the pigment particles are not bonded to the metal oxide particles to weaken the structure of the gel itself, and the resultant glass gel thin film cannot have a sufficiently high strength due to the following reason. The bonds of the metal oxide particles obtained by the sol-gel method are obtained since the surfaces of the particles are rich in hydroxyl groups and therefore the particles cause polycondensation. Such bonds cannot be expected between the pigment particles and the metal oxide particles.

In order to obtain a high hardness glass gel thin film containing coloring material particles, the porosity of the glass gel is reduced by increasing the sintering temperature to obtain a perfectly or almost perfectly vitrified film, thereby surrounding the coloring material with the structure. For this purpose, the sintering temperature must be 500° C. or more. The types of coloring material to be used are then limited.

According to various experiments of the present inventors, it has been found that no problem in water resistance occurs in glass gel films when the particle size of the coloring material is controlled to be 3 nm or more if the glass gel films is formed by sintering at a low temperature. It is also found that the hardness of the glass gel film is not degraded by coloring material particles if a material having an adsorption power for a coloring material used and excellent in affinity with a metal alkoxide and a hydrolysate thereof is added.

The function of the particle size of the coloring material of the present invention will be described in detail below.

A relationship between the particle size of the coloring material and the water resistance and resistance to light of the film will be described below.

EVALUATION OF WATER RESISTANCE

In order to evaluate water resistance, a rub test of thin film samples containing coloring materials having various particle sizes was performed for 500 reciprocal cycles with white pieces of cloth each moistened with water and a detergent, thereby checking eluting of the coloring materials from the films. Test results are shown in Table 1 below.

A glass gel film was obtained by sintering the following coating solution composition at 150° C. for 20 minutes:

| | |
|---|---|
| Si(OC$_2$H$_5$)$_4$ | 7.0 parts by weight |
| Nitric acid | 1.3 parts by weight |
| Water | 1.5 parts by weight |
| Pigment: HOSTAPERM | 0.25 parts by weight |
| Dispersant | 0.06 parts by weight |
| Isopropyl alcohol | 89.89 parts by weight |

The average particle sizes of the coloring materials were measured by a quasi-elastic light scattering method.

This method determines fluctuation of scattering light occurred by radiating a light to a dispersion solution containing a pigment scattering meter (produced by UNION corporation) is used for determination.

TABLE 1

| Average Particle Size of Coloring material | 0.5 nm | 1 nm | 3 nm | 10 nm |
|---|---|---|---|---|
| Rubbing with Cloth moistened with Water | x | o | o | o |
| Rubbing-with Cloth moistened with Detergent | x | Δ | o | o |

(x . . . eluted; o . . . not eluted)

Figure 1B:
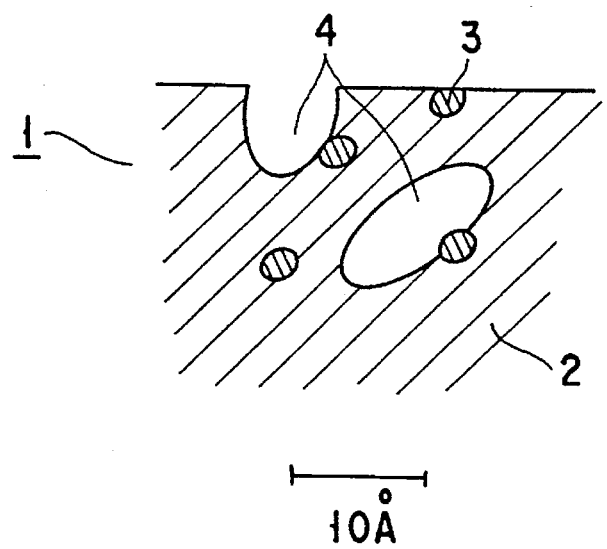

FIGS. 1A and 1B are views for explaining differences in effect in Table 1. FIG. 1A is a sectional view showing a state in which the particle size of the coloring material 3 is about 3 nm, and FIG. 1B is a sectional view showing a state in which the particle size of the coloring material 3 is about several Å. FIGS. 2A and 2B are enlarged views showing the bonded states between metal oxides 2 of glass gel thin films 1 and coloring material 3 in FIGS. 1A and 1B.

As shown in FIGS. 1A, 1B, 2A, and 2B, the glass gel thin films 1 consisting of the metal alkoxides and containing the coloring material 3 have net structures having a size of several Å, and pore portions 4 as defect portions are present at several positions. The size of the pore portions falls within the range of several Å to several hundreds of Å on the average.

As is apparent from FIG. 1A, water mainly permeates into the pore portions 4 to elute the coloring material 3. Therefore, if the particle size of the coloring material 3 is large, the contact area between the coloring material particles and the glass gel thin film 1 is large. Since the coloring material is firmly fixed by the metal oxide 2 constituting the glass gel thin film 1, elution tends not to occur, and the film strength is not degraded.

The degradation of the film strength may be assumed to be caused by the following reason explained with reference to FIG. 2B. Since the coloring material particles constitute part of the structure of the glass gel thin film, if bonds between the coloring material particles and the metal oxide and hydroxide particles are weak, the strengths of the corresponding part of the structure is weakened, thereby decreasing the strength of the film$_r$. However, as shown in FIG. 2B, if bonds between the coloring material particles and the metal oxide and hydroxide particles are strong, a sufficiently high strength of the structure of the glass gel thin film containing the coloring material particles is maintained, thereby preventing decrease of the film strength. This can be achieved by adding a material having an adsorption power for the coloring material and excellent affinity with the metal alkoxide and a hydrolysate thereof.

The pencil strengths (pencil hardness test JIS K5400) of the glass gel thin films used in the above rub test were 7 H or more regardless of the particle sizes. In the above rub test, the glass gel films on the surfaces were damaged by friction to similarly cause elution of the coloring material. In this case, however, decoloring did not occur due to the same reason as described above when the particle size of the coloring material is large. It is thus assumed that the results in Table 1 were obtained for the above reasons.

RESISTANCE TO ULTRAVIOLET RAYS

Not only can water resistance be improved but also the resistance to ultraviolet rays can be improved when the particle size of the coloring material is increased. In order to evaluate the resistance to ultraviolet rays, coloring material having different particle sizes were sealed in glass gel thin films, and the discoloration rates of these coloring material were measured. The results are shown in Table 2 below.

The glass gel thin film used in this evaluation test of resistance to ultraviolet rays was similar to the film used in the test of water resistance:

TABLE 2

| Average Particle Size of Coloring Material | 0.5 nm | 1 nm | 3 nm | 10 nm | 50 nm |
|---|---|---|---|---|---|
| Residual Ratio | 60% | 70% | 90% | 92% | 92% |

At this time, HOSTAPERM Pink E was used as the coloring material, and a metal halide lamp was used as a light source. The glass gel thin film was irradiated with 100 mW/cm$^2$ ultraviolet rays for 4 hours, and the residual ratios of absorption of a main absorption peak in the coloring material were compared with each other. The absorption residual ratio was defined as follows:

$$D=\{(1-T_n)/(1-T_0)\}\times 100(\%)$$

where $T_0$ is the initial main peak transmittance, and $T_n$ is the main peak transmittance after 4 hours.

As is apparent from Table 2, a better effect can be obtained when the particle size of the coloring material is increased. It is assumed that penetration of the ultraviolet rays inside the coloring material is suppressed as the particle size of the coloring material is increased, thereby protecting the coloring material molecules inside the film.

It is thus apparent-that a larger particle size of the coloring material can improve the water resistance and the resistance to light of the film.

When the particle size of the coloring material, however, exceeds 300 nm, light scattering occurs and this may to impair film transparency. A relationship between the particle size and the transparency is shown in Table 3 below. Transparency was evaluated by the following method. A glass substrate coated with a film which did not contain any coloring material was set on a black base colored with graphite, and its reflectance was defined as 100%. Glass substrates coated with films added with coloring material having various sizes were placed on the same base, and their reflectances were measured. An increase in reflectance was regarded as degradation of transparency.

The glass gel thin film used in this test was similar to the film used in the test of water-resistance.

TABLE 3

| Particle Size (nm) | 50 | 100 | 150 | 200 | 250 | 300 | 350 |
|---|---|---|---|---|---|---|---|
| Reflectance (%) | 97 | 99 | 99 | 98 | 102 | 100 | 110 |
| Transparency | good | good | good | good | good | good | bad |

The maximum diameter of a particle which allows any transmission of light is theoretically $\lambda/2$ or less when the light wavelength is defined as $\lambda$. Since visible light has a wavelength range of about 400 to 700 nm, light scattering occurs theoretically when the particle size exceeds 200 nm, thereby degrading transparency. According to the present invention, however, transparency is not degraded up to a particle size of 300 nm. Since the coloring material particles are contained in the glass gel thin film, a difference between the refractive index of the coloring material and that of the medium becomes small, thereby reducing the reflectance of the surface of the coloring material particle.

As described above, the particle size of the coloring material is preferably larger than the size of a defect of the glass gel thin film, i.e., 1 nm or more considering water resistance. The particle size of the coloring material is preferably as large as possible, i.e., a minimum of 3 nm or more considering light resistance. However, when the particle size is excessively large, transparency is degraded. The theoretical upper limit of the particle size is a maximum of 200 μm. According to the present invention, the particle size can be increased up to 300 nm thereby exceeding the above limit and going against this established teaching in the art. That is, the water resistance and the light resistance can be improved without impairing light transparency of the glass gel thin film when the particle size of the coloring material falls within the range of 3 nm to 300 nm.

In the above description, the particle size of the coloring material means an average particle size.

COATING SOLUTION

The particle size of the coloring material has been described above. A coating solution for forming a glass gel thin film will be described below.

As described above, in order to form a color glass gel filter according to the sol-gel method, a coating solution is required in which a coloring material is dispersed in an alcohol solution in which a metal alkoxide is dissolved.

The present inventors have made extensive studies to determine a suitable dispersant for uniformly dispersing a coloring material in a metal alkoxide solution. It is found that even if a resin soluble in an alcohol is used, if it is not adsorbed in a coloring material, i.e., if a dispersion power is not provided, the coloring material is coagulated and an uniform dispersion is not obtained, thereby obtaining an opaque, medium-clarity gel film. For example, a rosin resin, a ketone resin, and Shellac have such behaviors. Even if a resin is soluble in an alcohol and has a dispersability to the coloring material, if it does not have any miscibility with an alcohol solution containing a metal alkoxide, the resultant gel film becomes opaque and has medium clarity. For example, a vinyl pyrrolidone resin has such a behavior.

By using a dispersant satisfying the following conditions, dispersion properties of the coloring material can be greatly improved, and the strength of the resultant film can also be increased. That is, the present inventors have made extensive studies to find a material which is adsorptive to the coloring material and has an excellent affinity with a metal alkoxide and a hydrolysate thereof. If such a material is soluble in alcohol, it is found that the dispersion properties of the coloring material added to a glass gel coating solution can be greatly improved. In this manner, as a result of the extensive studies by the present inventors, it is thus found that use of a material which is soluble in an alcohol and has miscibility with a metal alkoxide and an adsorption function (dispersion property) for a pigment is used as a pigment dispersing means, an excellent dispersion can be obtained. Addition of a material which has an adsorption property for the coloring material and strong affinity with the metal alkoxide and the hydrolysate thereof has also been found to prevent a decrease in hardness of the glass gel film by the coloring material particles. These findings may be based on the following reasons As is apparent from FIGS. 2A and 2B, the coloring material particles constitute part of the structure of the glass gel thin film when bonds between the coloring material particles and the metal oxide and hydroxide particles are weak, the strength of the portion of these bonds in the structure is decreased, thereby reducing the strength of the resultant film. As described above, using a material which has an adsorption property for the coloring material and high affinity with the metal alkoxide and the hydrolysate thereof strengthens, the bonds between the coloring material particles and the metal oxide and hydroxide particles. The structure of the glass gel thin film containing the coloring material particles is also sufficiently strengthened. This prevents any decrease in strength of the film.

Effective examples of this dispersion are as follows.

(1) Polyvinyl butyral resin such as S-Lec BLS or S-Lec BL-1 (tradename; SEKISUI KAGAKU Corporation).

(2) Polyvinyl alcohol resin such as Gohselan L-0301 (tradename; NIPPON GOSEI KAGAKU Corporation).

(3) Acrylic resin such as Hitec 532 (tradename; NIPPON SHELLAC) Corporation.

(4) Ethyl cellulose such as Ethocel (tradename; DOW CHEMICAL Inc.).

(5) Unsaturated polycarboxylic acid such as BIG 104S (tradename; BIG CHEMIE Corporation).

(6) A phosphate activator such as Discol A-200 (tradename; DAIICHI KOGYO SEIYAKU Corporation).

(7) Polyester resin such as Polyester WR-901 (tradename; NIPPON GOSEI KAGAKU Corporation).

(8) Silane coupling agent such as KBM-502 and BBM-902 (tradenames; SHINETSU KAGAKU KOGYO).

(9) Titanium coupling agent such as B-1 (TBT) (tradename; KIPPON SODA).

(10) Aluminum coupling agent such as Alumichelate M (tradename; KAWAKEN FINE CHEMICAL).

The content of such a material preferably falls within the range of 5 parts by weight to 100 parts by weight with respect to 100 parts by weight of the coloring material.

Note that several kinds of coloring material react with metal alkoxide to cause change with time in solution. The present inventors have found that such a coloring material can be protected by dispersant to be stabilized.

Such a dispersant is effective when an amount of the dispersant is about not less than 0.01 weight %. However, when there is too much of the dispersant, it tends to be uneffective to maintain strength of the film, and the strength of the film is thereby decreased. This is because a dispersant has a supplementary role in which it expendits to bind coloring material particles with metal oxide while a dispersant itself does not constitute a film. Therefore, the amount of the dispresant is preferably not more than 200 wt. %.

A metal alkoxide is generally represented by a formula $M(OR)_n$ wherein M represents a metal element, OR represents an alkoxyl group, and n is an oxidation number of a metal. A typical example of this metal alkoxide is $Si(OR)_4$. Furthermore, alkoxides of Zn, Ti, Al, Fe, Co, Ni, and the like can be used singly or as a mixture of two of more thereof in accordance with specific application purposes. For example, a Ti or Zn alkoxide is used to increase the reflectance, a Zn alkoxide is used to increase the strength and the resistance to alkalis, and an Ni alkoxide is used to increase the light resistance. In these cases, a coloring material can be dispersed by substantially the same technique as described above. $SiO_2$ as a decomposed product of $Si(OR)_4$ enters a gap between the substrate and the coloring material and serves as a binder. R in $M(OR)_n$ represents an alkyl group preferably having 1 to 5 carbon atoms.

An alcohol for dissolving the alkyl group may be arbitrarily selected in consideration of an increase in viscosity of an $M(OR)_n$ alcohol solution with an increase in the number of carbon atoms. A generally used alcohol is one having 1 to 5 carbon atoms.

Almost all organic pigments and lake powders can be used as coloring materials in coating solution compositions of the present invention. Examples of the coloring material are azo yellow and red pigments (e.g., benzidine yellow and carmine FB), condensed pigments (e.g., perylene, perynone, dioxadine, thioindigo, isoindolinone, quinophthalone, or quinacridone), phthalocyanine-type pigments, inorganic pigments (e.g., titanium white, iron oxide, chrome yellow, cobalt blue, carbon black, ultramarine, prussian blue and molybdate orange). A preferable coloring material can be selected in consideration of the emission spectrum of an device for forming a glass gel film. For example, a coloring material having a large filter absorbency at a low-energy spectral range can be selected. The coloring property of the coloring material varies depending on the types of coloring material. Transmittance of the maximum light-absorbing portions were measured using an organic pigment HELIOGEN BLUE EP-7S, and results in Table 4 below are obtained.

A glass gel thin film used in the above measurement was obtained by sintering the following coating solution composition at 150° C.:

| $Si(OC_2H_5)_4$ | 7.0 parts by weight |
|---|---|
| Nitric acid | 1.3 parts by weight |
| Water | 1.5 parts by weight |
| Dispersant | 0.00007 to 0.7 parts by weight |
| Organic pigment (tradename; HELIOGEN BLUE EP-S7) | 0.00007 to 0.7 parts by weight |
| Isopropyl alcohol | balance |

TABLE 4

| Content (wt %) | 0.001 | 0.005 | 0.01 | 0.05 | 0.10 |
|---|---|---|---|---|---|
| Transmittance (%) | 100 | 98 | 95 | 77 | 60 |
| Coloring | No | No | Yes | Yes | Yes |

As is apparent from Table 4, the content of the coloring material is found to preferably fall within the range of 0.01 parts by weight or more with respect to 100 parts by weight of the metal alkoxide.

A relationship between the coloring material content with respect to the metal alkoxide and the film strength is shown in Table 5.

A glass gel thin film used was obtained by calcining the following coating solution composition:

| $Si(OC_2H_5)_4$ | 7.0 parts by weight |
|---|---|
| Nitric acid | 1.3 parts by weight |
| Water | 1.5 parts by weight |
| Dispersant | 1.7 to 3.7 parts by weight |
| Organic pigment (HELIOGEN BLUE EP-7S) | 7.0 to 15.4 parts by weight |
| Isopropyl alcohol | balance |

TABLE 5

| Content (wt %) | 1.0 | 2.0 | 10.0 | 20.0 | 100 | 150 | 210 | 220 |
|---|---|---|---|---|---|---|---|---|
| Film Strength | 8H | 8H | 7H | 7H | 7H | 6H | 6H | 5H |

Since a film pencil hardness of 6 H or more is required on a practical level, the content of the coloring material preferably falls within the range of 200 parts by weight or less with respect to 100 parts by weight of the metal alkoxide.

When coloring and the film strength are taken into consideration, the content of the coloring material preferably falls within the range of 0.01 part by weight to 200 parts by weight with respect to 100 parts by weight of the metal alkoxide. If the content of the coloring material is smaller than 0.01 part by weight, coloring becomes insufficient, and the film does not serve as a filter. When the content, however, is excessively high, the film itself becomes weak. In this case, decoloring occurs even if a coloring material having a particle size falling within the range of the scope of the present invention is used.

The total content of a solid portion (i.e., the total content of a metal alkoxide, a polycondensate of the metal alkoxide, a coloring material, and a dispersant) with respect to the total amount of the coating solution must be 50 parts by weight or less in favor of solution stability. When the content of the solid portion exceeds 50 parts by weight, the solution itself upon its preparation is gelled in a day. Before the solution is gelled, its solution properties such as the viscosity change gradually, and coating cannot be performed under the same condition. In order to obtain a practical thickness of 0.1 μm or more, the total content of the solid portion is preferably 0.1 part by weight or more.

Since the particle size of the coloring material is large, the coloring material is not easily susceptible to the adverse influence of an acid as a catalyst in the coating solution. A coloring material which has a slightly poor resistance to an acid can therefore be used. Since the coloring material has a large particle size, the coating solution can be stably preserved.

The coating solution composition according to the present invention preferably satisfies the following conditions, i.e., B/A=0.0001 to 2, C/A=0.0001 to 2, and (A+B+C)/D=0.001 to 0.5 where A is the total weight of the metal alkoxide, B is the total weight of the coloring material, C is the total weight of the dispersant, and D is the total weight of the coating solution.

In addition, C/B is preferably between 0.05 and 1. If C/B is more than 1, stability of a coloring material may be decreased due to the metal alkoxide which tends to react with the coloring material. If C/B is less than 0.5, film strength formed by using the coating solution is decreased.

Examples of the dispersion machine for preparing a dispersion are a twin roll mill, a triple roll mill, a Banbury mixer, an SG mill, and an attritor.

COLOR GLASS GEL FILTER

A color glass gel filter according to the present invention can be obtained by applying the coating solution composition to a substrate according to the sol-gel method. In the resultant color glass gel filter, a coloring material having a desired spectral transmissivity is contained in an inorganic glass gel thin film containing, e.g., $SiO_2$ as a major constituent, and the average particle size of the coloring material is set to fall within the range of 3 nm to 300 nm. In this case, since a material having an adsorption property for the coloring material and strong affinity with the metal alkoxide and the hydrolysate thereof is added, the decrease in hardness of the glass gel film by the coloring material particles embedded between glass gel particles embedded between glass gel particles can be prevented. That is, the bonds between the coloring material particles and the metal oxide and hydroxide particles can be strengthened, and the structure of the glass gel film containing the coloring material particles can be kept strengthened. Therefore, there is no decrease in film strength.

The film thickness practically falls within the range of 0.1 μm to 3 μm. when the film thickness is less than 0.1 μm, coloring of the film is deficient. However, when the film thickness exceeds 3 μm, cracking and whitening occur. The resultant film cannot be used in practice.

DISPLAY DEVICE

The color glass gel filter is formed on a light-transmitting display unit substrate of a display device to improve contrast, color purity, and the like.

Examples of the display device include a color picture tube, a monochrome picture tube, a projection type color TV set, a liquid crystal display, a projection type liquid crystal display, and a plasma display. The coating solution is normally applied to a screen glass substrate serving as a light-transmitting display unit substrate to form a filter film. However, in a projection display device, a filter film may be formed on a projection screen.

A coloring material must be selected in consideration of the emission spectrum of each display device. For example, a coloring material having a large filter absorbency in a low-energy spectral range can be selected.

The present invention is also applicable to coating on the inner or outer surface of a lamp such as a fluorescent lamp to change the light emission color in addition to applications to the display devices. In this case, a coloring material is selected to cut off light having a specific wavelength.

In addition, the present invention is applicable to a magnetic disk, an optical disk, and the like.

As described above, according to the present invention, there is provided a coating solution composition which has a large degree of freedom of coloring selection, which is excellent in water resistance and resistance to ultraviolet rays, and which provides a thin film having a high strength at a low sintering temperature by the sol-gel method, and a color glass gel filter using this coating solution liquid.

There is also provided a display device having a high contrast and a high color purity by appropriately selecting a coloring material.

The present invention will be described in detail by ways of its embodiments with reference to the accompanying drawings.

EMBODIMENT 1

| | |
|---|---|
| HOSTAPERM Pink E (pigment) | 2.5 parts by weight |
| TSL 8311 (silane coupling agent, available from Toshiba Silicone) | 0.1 parts by weight |
| Ethocel 7CP (ethylcellulose) | 6.5 parts by weight |
| Isopropyl alcohol | 96.9 parts by weight |

The above materials were dispersed in an SG mill (dispersing machine) using 0.5-mm zircon beads for 12 hours to prepare a pigment dispersion (pigment dispersion 1). The following materials were mixed at the following mixing ratio by a marine propeller stirrer to obtain a coating solution composition containing a coloring material having an average particle size of about 20 nm.

| | |
|---|---|
| $Si(OC_2H_5)_4$ (metal alkoxide) | 7.0 parts by weight |
| Nitric acid | 1.3 parts by weight |
| Water | 1.5 parts by weight |
| Pigment dispersion 1 | 10.0 parts by weight |
| Isopropyl alcohol | 80.2 parts by weight |

The composition ratio of the above coating solution composition was as follows.

| | |
|---|---|
| $Si(OC_2H_5)_4$ (metal alkoxide) | 7.0 parts by weight |
| Nitric acid | 1.3 parts by weight |
| Water | 1.5 parts by weight |
| Pigment | 0.25 parts by weight |
| Dispersant | 0.06 parts by weight |
| Alcohol | 89.89 parts by weight |

The resultant composition satisfies the ratios B/A=0.036, C/A=0.0086, (A+B+C)/D=0.073, and C/B=0.24 where A is the total weight of the metal alkoxide, B is the total weight of the coloring material, C is the total weight of the dispersant, and D is the total weight of the coating solution.

This composition was applied to a glass substrate and was sintered at 150° C. for 20 minutes to obtain a color glass gel filter having a film thickness of 0.2 μm.

Light-transmitting characteristics of the color glass gel filter formed by the coating solution composition of this embodiment are represented by a characteristic curve 6A in FIG. 3. A rub test using a detergent was conducted to evaluate water resistance of the color glass gel filter, and no decoloring occurred. In addition, the resistance to ultraviolet rays was as high as 92%. The strength of the film was 8 H in a pencil hardness test, thus exhibiting a sufficiently high practical hardness. The pencil hardness test is performed according to JAPANESE INDUSTRIAL STANDARDS (JIS) K 5400. A pot life of the coating solution was as long as about a month, as compared with a conventional pot life of a week, thereby providing excellent properties.

EMBODIMENT 2

A structure in which the color glass gel filter prepared in Embodiment 1 is formed on the outer surface of a screen of a color picture tube will be described below.

FIG. 4 is a partially cutaway sectional view showing a color picture tube manufactured according to the present invention. A color picture tube 10 comprises an internally evacuated, hermetic glass envelope 11. This envelope 11 has a neck 12 and a cone continuously extending from the neck 12. The envelope 11 also has a faceplate 14 sealed with the cone 13 by frit glass. A metal tension band 15 is wound around the side walls of the faceplate 14 to prevent explosion. An electron gun assembly 16 for emitting electron beams is arranged in the neck 12. A phosphor screen 17 is arranged inside the faceplate 14. The phosphor screen 17 comprises stripe-like phosphor layers excited with the electron beams from the electron gun assembly 16 to emit red, green, and blue light beams, and stripe-like black light-absorbing layers arranged between the red, green, and blue phosphor layers. A shadow mask (not shown) having apertures on its entire area is disposed near the phosphor screen 17. Deflection units (not shown) for deflecting electron beams to scan the phosphor screen 17 are mounted on the outer surface of the cone 13.

A color glass gel filter 18 having selective light-absorbing properties is formed on the outer surface of the faceplate 14 of the color picture tube 10 by spin coating. The sintering temperature and thickness of the filter 18 are equal to those of Embodiment 1.

This filter has an absorption peak at 575±20 nm in the wavelength range of 400 to 650 nm. In addition, this filter satisfies the following conditions:

$$T_{min} \leq T_{550} < T_{530}$$

$$1 \leq T_{450}/T_{630} \leq 2$$

$$1 \leq T_{630}/T_{530} \leq 2$$

$$0.7 \leq T_{450}/T_{530} \leq 1.43$$

where $T_{450}$ is the transmittance for light having a wavelength of 450 nm, $T_{530}$ is the transmittance for light having a wavelength of 530 nm, $T_{550}$ is the transmittance for light having a wavelength of 550 nm, $T_{630}$ is the transmittance for light having a wavelength of 630 nm, and $T_{min}$ is the transmittance for light having a wavelength corresponding to the absorption peak.

More specifically, the above conditions are represented by the characteristic curve 6A in FIG. 3. FIG. 3 shows reference numeral 6 denotes a light-transmitting characteristic curve of the color glass gel filter; and 7, light emission spectra of the color picture tube. An effect of the contrast improvement was evaluated using the ratio of a decrease $\Delta B$ in brightness to a decrease $\Delta R_f$ in reflectance of external light, i.e., BCP (Brightness Contrast Performance)= $\Delta B/(\Delta R_f)^{1/2}$. As a result, the sample of this embodiment had a BCP of 1.07. The water resistance, the resistance to ultraviolet rays, and the film strength were equal to those of Embodiment 1.

The water resistance and the resistance to ultraviolet rays can be increased without decreasing the film strength of the color glass gel filter which can improve color purity.

EMBODIMENT 3

| | |
|---|---|
| Permanent Carmine FBB-02 (pigment) | 2.5 parts by weight |
| Gohselan L-0301 (polyvinyl alcohol resin) | 0.5 parts by weight |
| Isopropyl alcohol | 97.5 parts by weight |

The above materials were dispersed following the same procedures as in Embodiment 1 to prepare a pigment dispersion (pigment dispersion 2).

The following materials were dispersed following the same procedures as described above to prepare a pigment dispersion (pigment dispersion 3).

| | |
|---|---|
| Heliogen Blue EP-7S (pigment) | 2.5 parts by weight |
| Plenact KR44 (titanium coupling agent) | 0.1 parts by weight |
| Hitec 532 (acrylic resin) | 0.5 parts by weight |
| N-butyl alcohol | 96.9 parts by weight |

The following materials were mixed at the following mixing ratio by a marine propeller stirrer to obtain a coating solution composition containing a coloring material having an average particle size of about 5 nm.

| | |
|---|---|
| $Si(OC_2H_5)_4$ (metal alkoxide) | 5.0 parts by weight |
| $Zr(OC_2H_5)_4$ (metal alkoxide) | 2.0 parts by weight |
| Nitric acid | 0.5 parts by weight |
| Water | 0.5 parts by weight |
| Pigment dispersion 2 | 8.0 parts by weight |
| Pigment dispersion 3 | 2.0 parts by weight |
| Isopropyl alcohol | 82.0 parts by weight |

The composition ratio of the above coating solution composition was as follows.

| | |
|---|---|
| Metal alkoxides | 7.0 parts by weight |
| Nitric acid | 0.5 parts by weight |
| Water | 0.5 parts by weight |
| Pigments | 0.25 parts by weight |
| Dispersant | 0.052 parts by weight |
| Alcohol | 91.608 parts by weight |

The resultant composition satisfied ratios B/A=0.036, C/A=0.0074, (A+B+C)/D=0.073 wt. %, and C/B=0.208 where A is the total weight of the metal alkoxides, B is the total weight of the coloring material, C is the total weight of the dispersant, and D is the total weight of the coating solution. This composition was applied to a glass substrate and was sintered at 150° C. for 20 minutes to obtain a color glass gel filter having a film thickness of 0.2 μm.

Light-transmitting characteristics of the color glass gel filter formed by the coating solution composition of this embodiment are represented by the characteristic curve 6B in FIG. 3. A rub test using a detergent was conducted to evaluate water resistance of the color glass gel filter, and no decoloring occurred. In addition, the resistance to ultraviolet rays was as high as 90%. The strength of the film was 8 H in a pencil hardness test, thus exhibiting a sufficiently high practical strength.

EMBODIMENT 4

The coloring glass gel filter prepared in Embodiment 2 was formed on the outer surface of a screen of a color picture tube by spin coating. The sintering temperature and thickness of the filter are the same as those in Embodiment 2.

The characteristics of this filter are represented by the characteristic curve 6B in FIG. 3. This sample had a BCP that was 1.08. The water resistance, the resistance to ultraviolet rays, and the film strength were the same as those of Embodiment 3.

EMBODIMENT 5

| | |
|---|---|
| Iron oxide (pigment) | 2.5 parts by weight |
| S-Lec BLS (polyvinyl butyral resin) | 0.5 parts by weight |
| KBM 502 (Silane coupling agent) | 0.1 parts by weight |
| Isopropyl alcohol | 96.9 parts by weight |

The above materials were dispersed following the same procedures as in Embodiment 1 to prepare a pigment dispersion (pigment dispersion 4).

The following materials were mixed at the following mixing ratio by a marine propeller stirrer to obtain a coating solution composition containing a coloring material having an average particle size of about 50 nm.

| | |
|---|---|
| $Si(OC_2H_5)_4$ (metal alkoxide) | 7.0 parts by weight |
| Nitric acid | 1.3 parts by weight |
| Water | 1.5 parts by weight |
| Pigment dispersion 4 | 10.0 parts by weight |
| Isopropyl alcohol | 80.2 parts by weight |

The composition ratio of the above coating composition was given as follows:

| | |
|---|---|
| Metal alkoxide | 7.0 wt % |
| Nitric acid | 1.3 wt % |
| Water | 1.5 wt % |
| Pigment | 0.25 wt % |
| Dispersant | 0.06 wt % |
| Alcohol | 89.89 wt % |

The resultant composition satisfied ratios B/A=0.036, C/A=0.0086, (A+B+C)/D=0.073, and C/B=0.24 where A is the total wt. % of the metal alkoxide, B is the total wt. % of the coloring material, C is the total wt. % of the dispersant, and D is the total wt. % of the coating solution.

Figure 5:
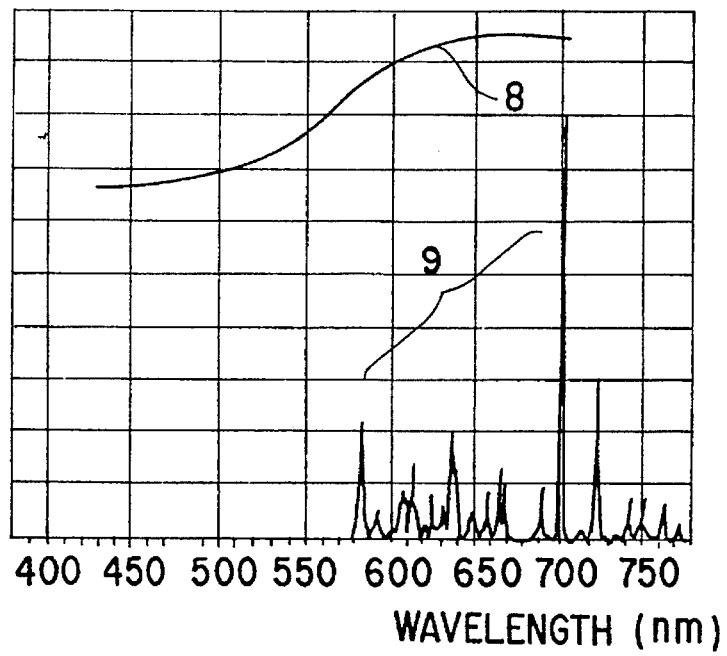
FIG. 5 is a graph showing a relationship between the light-transmitting characteristics of a color glass filter and the emission spectra of a plasma display according to another embodiment of the present invention.

This composition was applied to a glass substrate and was sintered at 150° C. for 20 minutes to obtain a color glass gel filter having a film thickness of 0.2 μm, thereby forming a color glass gel filter having characteristics represented by a characteristic curve 8 in FIG. 5.

A rub test using a detergent was conducted to evaluate the water resistance of the color glass gel filter, and no decoloring occurred. In addition, the resistance to ultraviolet rays was as high as 100%. A strength of the film was 8 H, thus exhibiting a sufficiently high practical strength.

EMBODIMENT 6

The color glass gel filter prepared in Embodiment 5 was formed on the outer surface of a screen of a plasma display. The sintering temperature and thickness of the filter were the same as those of Embodiment 2.

The filter characteristics are represented by the characteristic curve 8 in FIG. 5. Reference numeral 8 in FIG. 5 denotes a light-transmitting characteristic curve of the color glass gel filter; 9, light emission spectra of the plasma display. The sample of this embodiment had a BCP of 1.10. The water resistance, the resistance to ultraviolet rays, and the film strength of this sample were the same as those of Embodiment 3.

EMBODIMENT 7

A color glass gel filter as in Embodiment 1 was formed on the outer surface of a transmission type color liquid crystal display.

Figure 6:
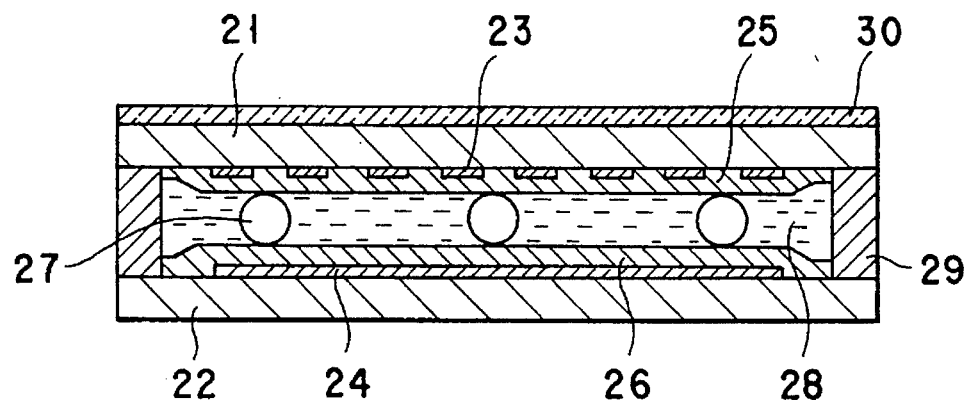
FIG. 6 is a sectional view showing a structure of a liquid crystal display according to still another embodiment of the present invention.

FIG. 6 shows an arrangement of a liquid crystal display of the present invention. This liquid crystal display comprises a pair of opposite glass substrates 21 and 22, electrodes 23 and 24 having predetermined patterns, consisting of ITO (Indium Tin Oxide), and respectively formed on the opposite surfaces of the substrates 21 and 22, alignment films 25 and 26 respectively formed on the opposite surfaces of the substrates 21 and 22, a spacer 27 fixed on the alignment films 25 and 26 between the pair of substrates 21 and 22 to define a gap between the pair of substrates 21 and 22, a liquid crystal 28 sealed between the substrates 21 and 22, and a sealing agent 29 for sealing the edges of the substrates 21 and 22 filled with the liquid crystal 28. A color glass gel filter 30 is formed on the outer surface of one substrate 21 constituting a display substrate.

The color glass gel filter 30 covers a portion except for a display substrate surface portion having the color glass gel filter 30 thereon. A glass gel thin S film coating solution as in Embodiment 1 is applied to the outer surface to a thickness of 0.1 μm and is sintered to form this color glass gel filter 30.

As a result, a good glass gel filter having a film strength of as high as 8 H was formed on the outer surface of the substrate. The characteristics of this filter are represented by the characteristic curve 6A in FIG. 3. A BCP of this filter sample was 1.06. The water resistance, the resistance to ultraviolet rays, and the film strength were almost equal to those of Embodiment 1.

EMBODIMENT 8

A transmission type liquid crystal display was exemplified in Embodiment 7. The present invention is also applicable to a projection type liquid crystal display. Using a composition as in Embodiment 1, a color glass gel filter was formed on a screen of a back projection type liquid crystal display, thereby obtaining a selective absorption filter.

The characteristics of this filter were substantially equal to those of Embodiment 1, and its BCP was 1.10. The water resistance, the resistance to ultraviolet rays, and the film strength were almost equal to those of Embodiment 1.

The above embodiments exemplify display devices such as a color picture tube and a liquid crystal display. However, the present invention is also applicable to coating on the inner or outer surface of a lamp such as a fluorescent lamp to change the light emission color in addition to applications to the display devices. In this case, a coloring material is selected to cut off light having a specific wavelength.

In addition, the present invention is further applicable to a laser recording member or the like.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A coating solution composition for forming a glass gel thin film, said coating solution composition comprising:

at least one metal alkoxide material selected from the group consisting of a metal alkoxide and a polycondensate of the metal alkoxide;

a pigment having a granular form with an average particle size of 3 nm to 300 nm and which is substantially insoluble in the coating solution;

an alcohol solvent; and a dispersant having an adsorption property for the pigment, dissolved in the alcohol solvent, and immiscible with the metal alkoxide;

wherein the pigment is also in granular form in the thin film, and wherein the pigment is an organic pigment.

2. A composition according to claim 1, wherein the solution has amounts that satisfy the following conditions:

$B/A = 10^{-4}$ to 2;

$C/A = 10^{-4}$ to 2; and $(A+S+C)/D = 10^{-3}$ to 0.5 where A is a total weight of the metal alkoxide or the polycondensate of the metal alkoxide, B is a total weight of the pigment, C is a total weight of the dispersant, and D is a total weight of the coating solution.

3. A composition according to claim 2, wherein the coating solution further satisfies:

$C/B = 0.05$ to 1

4. A composition according to claim 1, wherein the pigment has an average particle size falling within a range of 5 to 200 nm.

5. A composition according to claim 1, wherein said dispersant is selected from the group consisting of polyvinyl butyral resin, polyvinyl alcohol resin, acrylic resin, ethyl cellulose, unsaturated carboxylic acid, and phosphate ester surfactant.

6. A glass gel thin film having light-absorbing selectivity, prepared by sintering, at a temperature of 100° to 300° C., a coating film obtained such that a coating solution for forming the glass gel thin film is applied to a substrate, the coating solution comprising:

at least one material selected from the group consisting of a metal alkoxide and a polycondensate of the metal alkoxide;

a pigment having a granular form when an average particle size of 3 nm to 300 nm and which is substantially insoluble in the coating solution;

an alcohol solvent; and a dispersant having an adsorption power for the pigment, dissolved in the alcohol solvent, and immiscible with the metal alkoxide;

wherein the pigment is also in granular form in the thin film and wherein the pigment is an organic pigment.

7. A film according to claim 6, wherein the coating solution has amounts that satisfy the following conditions:

$B/A = 10^{-4}$ to 2;

$C/A = 10^{-4}$ to 2; and $(A+B+C)/D = 10^{-3}$ to 0.5 where A is a total weight of the metal alkoxide or the polycondensate of the metal alkoxide, B is a total weight of the pigment, C is a total weight of the dispersant, and D is a total weight of the coating solution.

8. A film according to claim 7, wherein the coating solution further satisfies the following condition:

$C/B = 0.05$ to 1

9. A film according to claim 6, wherein the pigment has an average particle size falling within a range of 5 to 200 nm.

10. A composition according to claim 6, wherein said dispersant is selected from the group consisting of polyvinyl butyral resin, polyvinyl alcohol resin, acrylic resin, ethyl cellulose, unsaturated carboxylic acid, and phosphate ester surfactant.

* * * * *